United States Patent
Skrabala et al.

(10) Patent No.: US 11,376,779 B2
(45) Date of Patent: *Jul. 5, 2022

(54) EXTRUDER SCREW, EXTRUSION DEVICE WITH EXTRUDER SCREW AND METHOD FOR PLASTICIZING A PLASTIC MATERIAL

(71) Applicant: KRAUSSMAFFEI EXTRUSION GMBH, Hannover (DE)

(72) Inventors: Otto Skrabala, Karlsfeld (DE); Stephan Roider, Unterhaching (DE)

(73) Assignee: KRAUSSMAFFEI EXTRUSION GMBH, Hannover (DE)

( * ) Notice: Subject to any disclaimer, the term of this patent is extended or adjusted under 35 U.S.C. 154(b) by 211 days.

This patent is subject to a terminal disclaimer.

(21) Appl. No.: 16/622,340

(22) PCT Filed: May 30, 2018

(86) PCT No.: PCT/EP2018/064181
§ 371 (c)(1),
(2) Date: Dec. 13, 2019

(87) PCT Pub. No.: WO2018/233995
PCT Pub. Date: Dec. 27, 2018

(65) Prior Publication Data
US 2020/0198209 A1    Jun. 25, 2020

(30) Foreign Application Priority Data
Jun. 22, 2017    (DE) .................... 10 2017 113 836.6

(51) Int. Cl.
B29C 48/64    (2019.01)
B29C 48/67    (2019.01)
(Continued)

(52) U.S. Cl.
CPC ............ *B29C 48/64* (2019.02); *B29C 48/605* (2019.02); *B29C 48/61* (2019.02); *B29C 48/67* (2019.02)

(58) Field of Classification Search
CPC ....... B29C 48/64; B29C 48/67; B29C 48/605; B29C 48/61
See application file for complete search history.

(56) References Cited

U.S. PATENT DOCUMENTS 3,300,810 A * 1/1967 Gregory .................. B29C 48/56
                                                                 366/82
3,584,340 A    6/1971 Koch
(Continued)

FOREIGN PATENT DOCUMENTS

CH    476568 A    8/1969
EP    1993807 A1    11/2008

OTHER PUBLICATIONS

International Search Report for PCT/EP2018/064181 dated Aug. 13, 2018.
(Continued)

*Primary Examiner* — Galen H Hauth
(74) *Attorney, Agent, or Firm* — Pearne & Gordon LLP

(57) ABSTRACT

An extruder screw for the plasticizing of at least one plastic material or a plastic material mixture, with a melting zone, a wave zone and a mixing zone arranged between the melting zone and the wave zone, wherein a conveying web extending in a helix-like manner along a screw longitudinal axis is formed in the melting zone and in the wave zone, wherein a conveying web of the melting zone terminates at an end of the melting zone facing the mixing zone, and a conveying web of the wave zone begins at an end facing the mixing zone. The application also relates to an extrusion (Continued)

device with this extruder screw, and a method for plasticizing at least one plastic material or a plastic material mixture.

15 Claims, 4 Drawing Sheets

(51) Int. Cl.
*B29C 48/605* (2019.01)
*B29C 48/61* (2019.01)

(56) References Cited

U.S. PATENT DOCUMENTS

| | | | |
|---|---|---|---|
| 3,701,512 A * | 10/1972 | Schippers | B29C 48/65 366/81 |
| 4,015,832 A | 4/1977 | Kruder | |
| 4,173,417 A | 11/1979 | Kruder | |
| 4,405,239 A | 9/1983 | Chung et al. | |
| 6,056,430 A | 5/2000 | Medici, Jr. et al. | |
| 6,179,461 B1 * | 1/2001 | Christiano | B29C 48/535 366/88 |
| 6,227,692 B1 | 5/2001 | Heathe | |
| 6,559,004 B1 | 5/2003 | Yang et al. | |
| 6,672,753 B1 | 1/2004 | Womer et al. | |
| 7,014,353 B2 | 3/2006 | Womer et al. | |
| 7,156,550 B2 | 1/2007 | Womer et al. | |
| 11,273,420 B2 * | 3/2022 | Skrabala | B01F 27/1143 |

OTHER PUBLICATIONS

Written Opinion for PCT/EP2018/064181 dated Aug. 13, 2018.
International Preliminary Examination Report for PCT/EP2018/064181 dated Sep. 3, 2019.
Rauwendaal, Chris, "Polymer Extrusion (5th Edition)", 2014, ISBN, 978-1-56990-516-6 pp. 568-570 & 604.

* cited by examiner

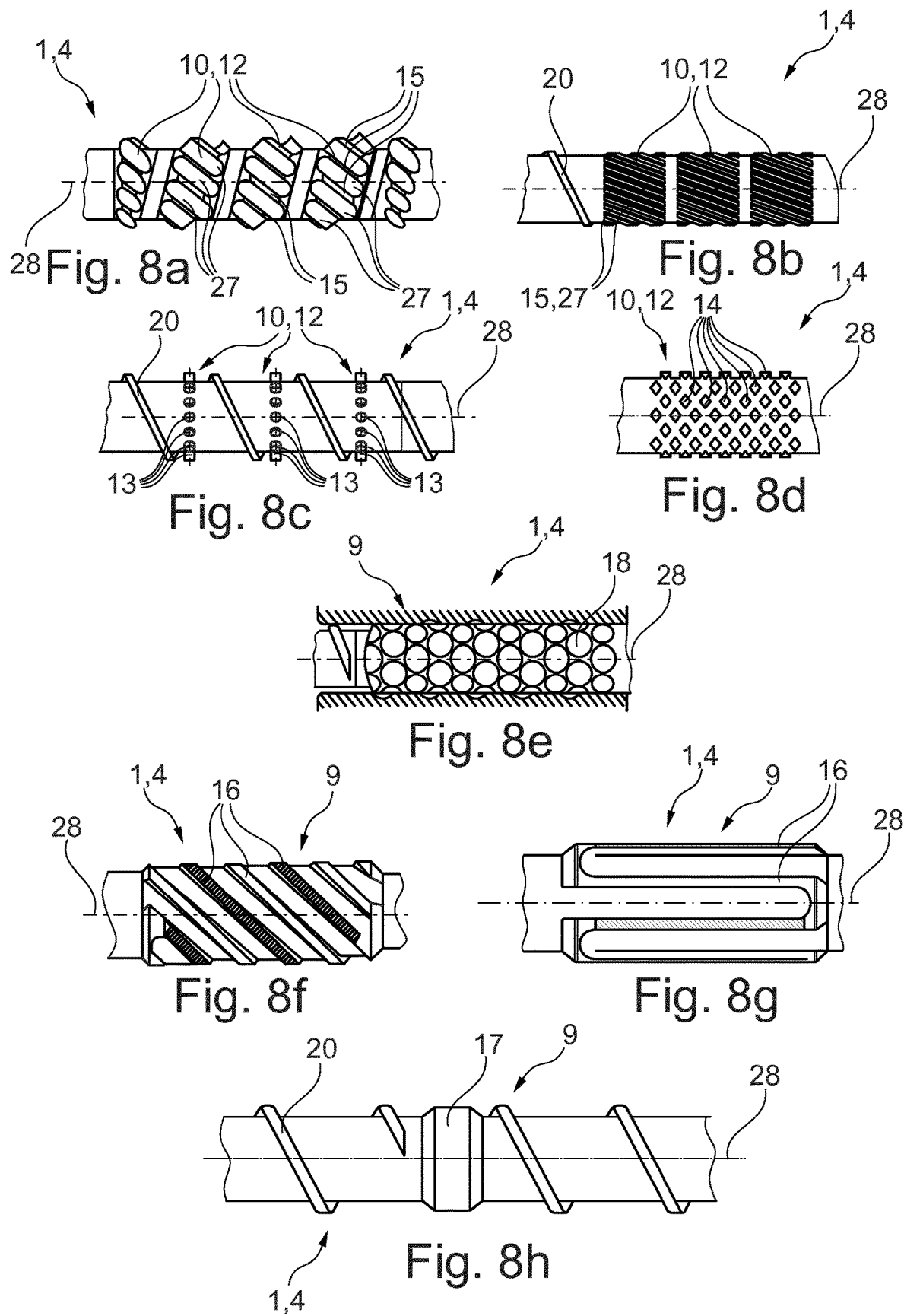

EXTRUDER SCREW, EXTRUSION DEVICE WITH EXTRUDER SCREW AND METHOD FOR PLASTICIZING A PLASTIC MATERIAL

CROSS-REFERENCE TO RELATED APPLICATIONS

This is a National Stage application of PCT international application PCT/EP2018/064181 filed on May 30, 2018, which claims the priority of German Patent Application No. 10 2017 113 836.6, filed Jun. 22, 2017, which are incorporated herein by reference in their entireties.

FIELD OF THE INVENTION

The invention relates to an extrusion screw for the plasticizing of at least one plastic material or of a plastic material mixture, with a melting zone, a wave zone (therefore concerning a zone which has at least one conveying flight altering its depth in a wave-shaped manner in longitudinal direction), and a mixing zone arranged between the melting zone and the wave zone, in direct connection to the melting zone, wherein a flight depth of the melting zone decreases continuously along the longitudinal axis of the screw towards the mixing zone or at least remains identical in sections and in the melting zone and in the wave zone a conveying web is formed, extending in a helix-like manner/with the formation of a helix along a longitudinal axis of the screw. The invention furthermore relates to an extrusion device with this extruder screw and a method for the plasticizing of at least one plastic material or plastic material mixture by means of the extrusion device.

BACKGROUND OF THE INVENTION

Numerous generic screw configurations are already known from the prior art.

By U.S. Pat. No. 4,173,417 A a wave screw is described, in which a compression zone (in conventional melting) directly adjoins a wave zone. Similar screws are also known from U.S. Pat. Nos. 4,405,239 A and 6,559,004 B2, in which a wave zone directly adjoins a compression zone. These screws have the disadvantage that the residual solid material of the plastic or of the plastic material, compacted to the solid material bed, enters into the wave zone as relatively large lumps. Thereby, it can occur that the wave zone plasticizes only with a relatively low efficiency.

Therefore, there have already been considerations to alter relevant screws in order to increase the efficiency of the wave zone. In this context, U.S. Pat. No. 6,056,430 A discloses a screw in which firstly melting is carried out with a barrier screw, wherein in a metering zone of the screw a wave zone is placed. The webs of the barrier section continue there into the wave zone. Between the barrier zone and the wave zone, a transition zone is placed, in which the function of the two webs is reversed. The barrier web therefore becomes the main web and the main web becomes the barrier web. Thereby, it is achieved that the solid material bed, which is firstly situated on the passive flank, is shifted to the active flank of the screw. Through the shifting, a greater shearing onto the solid material bed is to be built up. A mixing between the solid material and a melt of the corresponding plastic material is, however, not to take place here.

In addition, it is known from U.S. Pat. No. 6,672,753 B1 to combine a barrier zone with a wave zone of a screw, wherein a so-called reorientation zone is placed between these. Reorientation zones are also known from U.S. Pat. No. 7,014,353 B2 and U.S. Pat. No. 7,156,550 B2, wherein a barrier zone is always placed in front of the reorientation zone. A disadvantage of the screws provided with the respective reorientation zones can, however, also be seen in that in many cases no sufficiently great mixing of the residual solid material with the melt is present before the entry into the wave zone.

Prior art is likewise known from EP 1 993 807 B1, by which it is disclosed to combine a multiple-thread screw with a wave zone, wherein the wave zone is arranged behind the respective multiple-thread melting region. However, the higher pitch in the mixing zone compared to the zones adjoining the mixing zone is to be mentioned here as a disadvantage. Thereby, a relatively great space requirement, or respectively a reduction of efficiency in the case of an identical installation space, is the result.

Further prior art is known from U.S. Pat. No. 4,015,832 A.

BRIEF SUMMARY OF THE INVENTION

It is therefore the object of the present invention to eliminate the disadvantages known from the prior art and in particular to make available an extruder screw which enables a more efficient plasticizing of the respective plastic material or plastic material mixture.

According to a first idea in accordance with the invention, this is solved through the features of claim 1, wherein the (first) conveying web of the melting zone terminates at an end of the melting zone facing the mixing zone, and the (second) conveying web of the wave zone begins at an end facing the mixing zone. Therefore, the conveying web of the extruder screw is omitted/interrupted in the region of the mixing zone. The (first) conveying web of the melting zone terminates immediately at the start of the mixing zone. The mixing zone consequently does not have a conveying web. A conveying web designates in particular the web of the extruder screw, running in a helix-like manner, which serves for conveying the plastic material in axial direction along the longitudinal axis of the screw. Consequently, the mixing zone in particular has no conveying web running in a helix-like manner, which has/forms one or more thread pitch(es) extending entirely/around 360°.

Through the omission of the conveying web in the mixing zone, a significantly better mixing of the solid material content/residual solid material with the melt occurs before entry into the wave zone. Thereby, plasticizing can be carried out distinctly more effectively in the subsequent wave zone.

Further advantageous embodiments with regard to the first idea according to the invention are claimed with the subclaims and are explained in further detail below.

Accordingly, it is advantageous, furthermore, if the wave zone is arranged in direct connection to the mixing zone. The (second) conveying web of the wave zone terminates or begins then immediately at the end of the mixing zone.

Alternatively to the immediate/direct transition of the melting zone into the mixing zone, it is, however, also advantageous if between the melting zone and the mixing zone a further zone, preferably a (e.g. multiple-threaded, preferably double-threaded) metering zone is present, which again differs from the melting zone and from the mixing zone. Thereby, the efficiency for plasticizing is further increased.

Furthermore, it is advantageous in this connection if the melting zone is multi-threaded, preferably at least double-threaded, more preferably triple-threaded. Further preferably here, any/all web(s) of the melting zone terminate(s) at the end of the melting zone facing the mixing zone.

It is also expedient if the wave zone is multi-threaded, preferably double-threaded. Here, again, preferably any/all web(s) of the wave zone begin(s) only at the end of the wave zone facing the mixing zone.

In addition, it is advantageous if the melting zone is formed at least partially or completely as a compression zone.

With regard to the melting zone, it is also advantageous if the latter is formed at least partially or completely as a (single- or multi-threaded) barrier zone, wherein in addition to the conveying web, a barrier web is present in the melting zone, which barrier web has a smaller radial height than the conveying web. Thereby, the plasticizing is already further increased before the entry into the mixing zone. The barrier zone per se is further preferably likewise multi-threaded, for instance double-threaded, and is therefore formed with several, preferably two, barrier webs. The barrier webs then also preferably all terminate at the end of the melting zone/barrier zone facing the mixing zone.

In order to further improve the comminution of the residual solid material entering into the mixing zone, it is also advantageous if the mixing zone has at least one (distributive and/or disperse) mixing section promoting a distributive and/or disperse mixing of a solid material content with a plasticizing content/melt content of the at least one plastic material or plastic material mixture.

In this connection, it is particularly advantageous if the at least one mixing section is formed in one piece with regard to material/integrally with a screw section forming the mixing zone, or separately/individually with respect to the screw section forming the mixing zone (with the formation of a separate mixing element or of separate mixing elements). Thereby, numerous possibilities are provided in order to adapt the corresponding mixing zone individually to the plastic material which is to be plasticized.

In this respect it is, furthermore, advantageous if the at least one mixing section is configured as a toothed disc, a perforated disc, a mixing pin or a rhombic element or has one or more elongated/strip-shaped elevation(s). Thereby, in particular the distributive mixing in the mixing zone is increased.

In order to promote the disperse mixing it is, in addition, advantageous if the at least one mixing section is configured as a shear gap, a blister ring or a wedge gap element/wedge gap region.

The mixing is further improved if the mixing zone has several of these mixing sections, promoting the distributive and/or disperse mixing of the solid material content with the plasticized content of the plastic material.

According to a further, second idea according to the invention, the invention also relates to an extruder screw for the plasticizing of at least one plastic material or a plastic material mixture, with a melting zone, a wave zone and a mixing zone arranged between the melting zone and the wave zone, wherein the three zones have respectively a conveying web extending in a helix-like manner along a longitudinal axis of the screw, and a web pitch (screw-/helix pitch) of a (third) conveying web running in the mixing zone is smaller than or equal in size to a web pitch of a (first and/or second) conveying pitch running in the melting zone and/or in the wave zone, wherein the melting zone is equipped exclusively with at least one conveying web extending in a helix-like manner along the longitudinal axis of the screw, which conveying web has a constant radial height. The melting zone can be equipped exclusively with several (e.g. two, three, four or more) conveying webs extending in a helix-like manner along the longitudinal axis of the screw, which conveying webs have the same radial height (with respect to one another and/or viewed over their length). Alternatively, the conveying web(s) of the melting zone can have a continuously/linearly decreasing height towards the mixing zone/downstream. Consequently, the melting zone has conveying webs running exclusively in a helix-like manner, which form one or more thread pitches extending completely/through 360°. Therefore, the extruder screw is configured without barrier web.

Thereby, a conventional melting zone is arranged before the mixing zone and the structure of the extruder screw is further simplified. Through the mixing zone according to the invention, nevertheless a sufficiently effective comminution and mixing of the solid material content with the melt component is made possible before entry into the wave zone.

With regard to this second idea according to the invention, it is pointed out that this can also be further developed through the previously described advantageous embodiments with regard to the first idea according to the invention.

Further advantageous embodiments with regard to the second idea according to the invention are claimed with further subclaims and are explained in further detail below.

Accordingly, it is also advantageous if the (third) conveying web of the mixing zone has an opening/interruption. Therefore, the (third) conveying web formed/running in the mixing zone is formed in sections or continuously. Thereby, the plasticizing in the mixing zone is further improved.

If the mixing zone is configured so as to be single-threaded, a particularly suitable compromise is realized between a conveying capacity and a sufficient mixing and communition.

With regard to the first idea according to the invention, it is pointed out that this can also be further developed through the previously described advantageous embodiments with regard to the second idea according to the invention. Therefore, the features and/or advantageous embodiments of the extruder screw according to the first idea according to the invention can be combined and/or further developed with the features and/or advantageous embodiments of the extruder screw according to the second idea according to the invention, depending on the purpose.

Furthermore, the invention relates to an extrusion device/extruder with an extruder screw according to the invention, in accordance with one of the previously described embodiments, i.e. with an extruder screw according to the first idea according to the invention or with an extruder screw according to the second idea according to the invention.

Furthermore, the invention relates to a method for plasticizing at least one plastic material or a plastic material mixture by means of the extrusion device.

In other words, through the embodiments according to the invention, a better distribution and breakdown of the solid material content and a more intensive mixing with the melt are achieved, which in turn promotes the melting process in the wave zone. Thereby, in the wave zone, with consistent geometric dimensions, more residual solid material is melted. The throughputs can be further increased without having to enlarge the overall size of the machine. A throughput increase furthermore has a positive influence on the operating costs and on the investment costs, because with smaller machines the desired output is already achieved. In addition, it is expected that the combination of conventional melting and disperse melting (in the wave zone) enables a throughput increase, without seriously increasing the outlet temperature of the melt. This, in turn, has a positive influence on the operating costs and on the manufacturing costs of the respective extruded products.

BRIEF DESCRIPTION OF THE DRAWINGS

The invention is now explained in further detail below with the aid of the figures, in which connection various example embodiments are presented to illustrate the ideas according to the invention.

There are shown.

DESCRIPTION OF EXAMPLE EMBODIMENTS

The figures are only diagrammatic in nature and serve solely for an understanding of the invention. The same elements are given the same reference numbers. It is also pointed out that the different features of the various figures and example embodiments can in principle be combined with one another.

Figure 1:
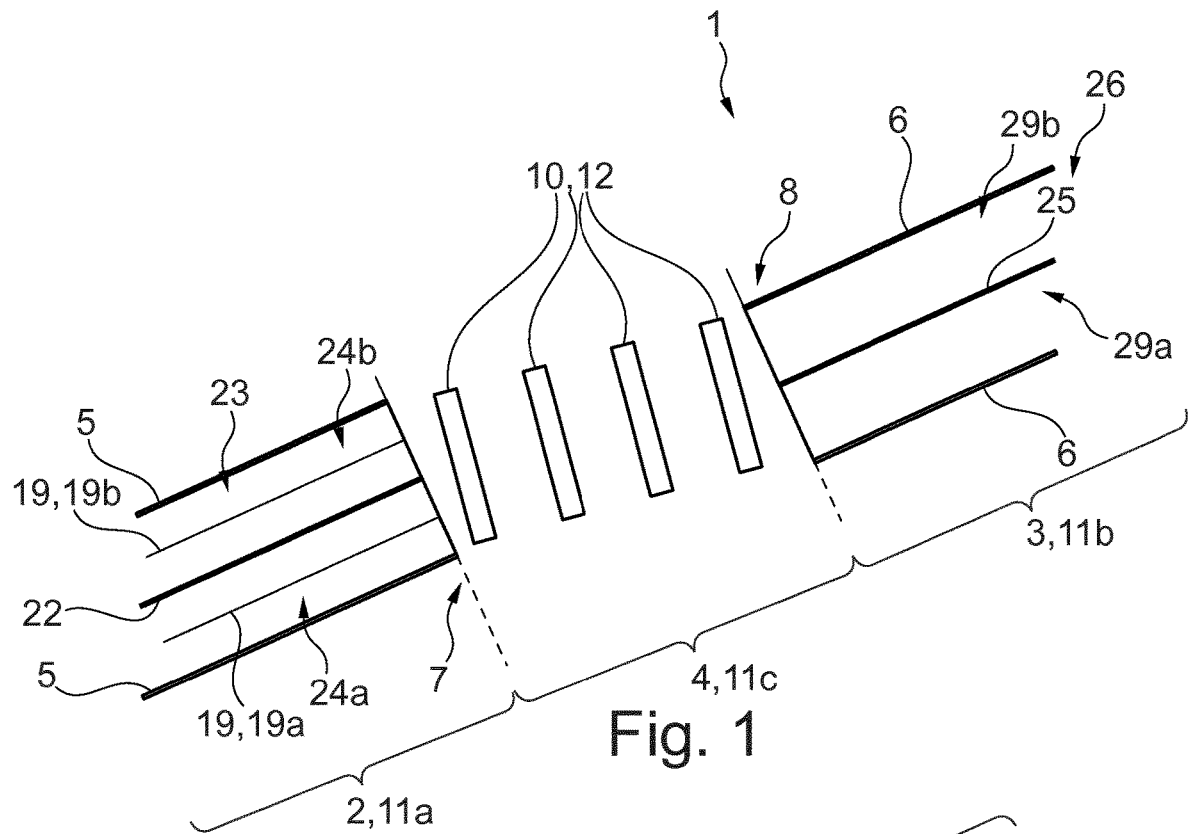
FIG. 1 a diagrammatic view of a portion of an extruder screw according to the invention in accordance with a first example embodiment, wherein the extruder screw is shown unwound and in a horizontal position, and wherein a mixing zone is embodied in a web-free manner and a melting zone is embodied as a barrier zone, FIG. 2 a diagrammatic view of a portion of an extruder screw according to the invention in accordance with a second example embodiment, wherein the extruder screw is shown unwound and in a horizontal position, as in FIG. 1, wherein the melting zone is now configured as a conventional melting zone, FIG. 3 a diagrammatic view of a portion of an extruder screw according to the invention in accordance with a third example embodiment, wherein the extruder screw is shown unwound and in a horizontal position, wherein the mixing zone, as also the melting zone and a wave zone, is provided with a conveying web and several mixing sections in the mixing zone, as also in FIGS. 1 and 2, are dispensed with, FIG. 4 a diagrammatic view of a portion of an extruder screw according to the invention in accordance with a fourth example embodiment, wherein the extruder screw is shown unwound and in a horizontal position, as in FIG. 3, wherein additionally mixing sections are present in the mixing zone, FIG. 5 a diagrammatic view of a portion of an extruder screw according to the invention in accordance with a fifth example embodiment, wherein the extruder screw is shown unwound and in a horizontal position, as in FIG. 4, wherein the conveying web of the mixing zone is additionally provided with openings, FIG. 6 a detailed perspective illustration of a mixing zone, used in FIGS. 1, 2, 4 and 5, with mixing sections, FIG. 7 a lateral illustration of a screw section of the extruder screw of the fifth example embodiment, having the mixing zone, by which the configuration of the openings is shown more clearly, and FIGS. 8a to 8h further example embodiments with respect to the mixing sections able to be used in FIGS. 1, 2 and 4 and 5.
Figure 2:
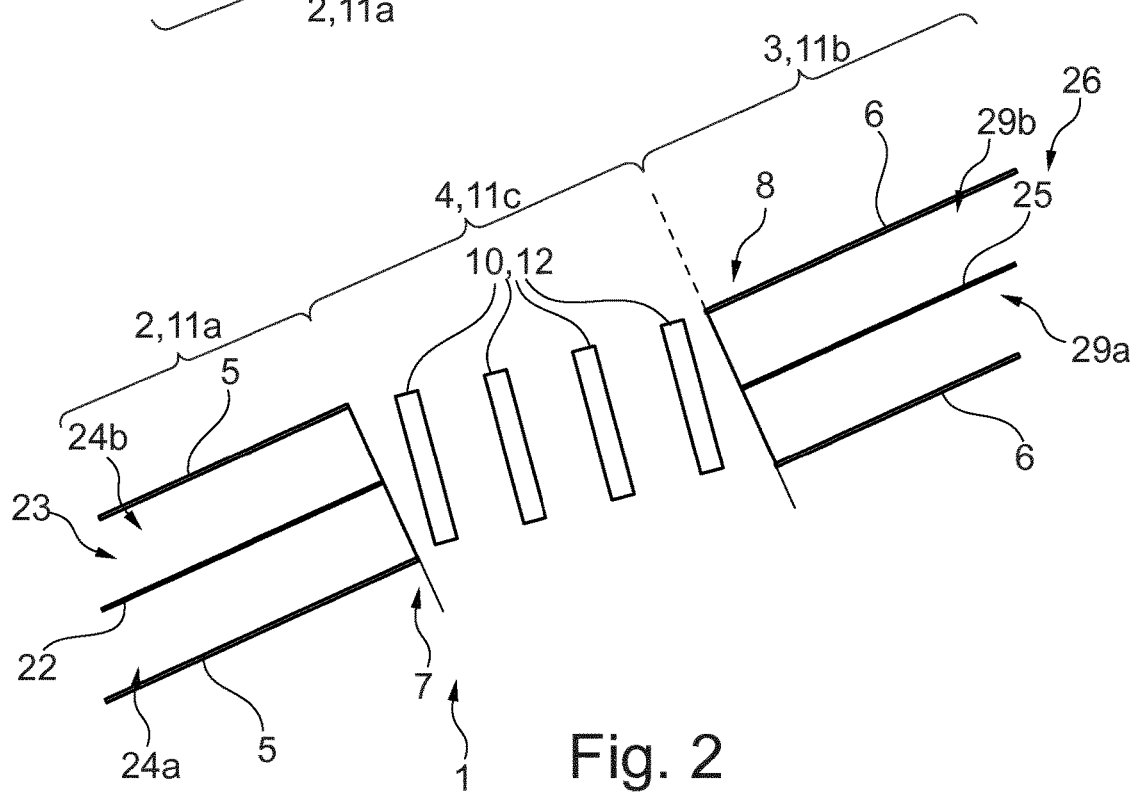

In connection with FIGS. 1 and 2, two example embodiments are illustrated, which show the first idea according to the invention. In connection with FIGS. 3 to 5 and 7, furthermore three example embodiments are illustrated, which show the second idea according to the invention. The embodiments of the mixing sections 9, 10, as are shown in FIGS. 6 and 8a to 8h, are basically applicable to all example embodiments, in particular the example embodiments shown by the FIGS. 1, 2, 4 and 5. It is also pointed out that the extruder screws 1 according to the invention, of the first to fifth example embodiments, are basically constructed and function identically, for which reason, for the sake of brevity, with regard to the second to fifth example embodiments, only their differences from the first example embodiment or with respect to one another, are explained below.

The first example embodiment is shown by FIG. 1. The extruder screw 1 according to the invention is shown in a diagrammatic, angled illustration. The extruder screw 1 serves in a conventional manner for plasticizing at least one plastic material/plastic material component or a plastic material mixture in the form of a plurality of plastic material components. The extruder screw 1 is used in a conventional manner in its operation in an extrusion device/extruder, which extrusion device is not illustrated further here, for the sake of clarity. The extrusion device has, in a typical manner, a housing/extrusion housing with an inlet and an outlet. The extruder screw 1 extends with its zones 2, 3, and 4, which are described in further detail below, between the inlet and the outlet, and is rotatably arranged radially within a cylindrical wall of the housing. By means of this extruder screw 1, in operation of the extrusion device, an extrusion component/extruded component is produced according to a manufacturing method, wherein the at least one plastic material is delivered in solid form to the inlet, is plasticized through the extruder screw 1 and is ejected at the outlet finally for the formation of the extrusion component. For plasticizing, the at least one plastic material passes through the zones 2, 3 and 4 of the extruder screw 1, which are described in further detail below.

In FIG. 1 it can be seen that the three zones 2, 3 and 4 are configured in the form of a melting zone 2, a mixing zone 4 and a wave zone 3. The mixing zone 4 directly/immediately adjoins the melting zone 2 downstream/in extrusion direction. The wave zone 3 directly/immediately adjoins the mixing zone 4. The melting zone 2 is formed on a first screw section 11a of the extruder screw 1; the wave zone 3 is formed on a second screw section 11b of the extruder screw 1; the mixing zone 4 is formed on a third screw section 11c of the extruder screw 1. The three screw sections 11a, 11b, 11c therefore immediately adjoin one another/continue immediately into one another in axial direction of the extruder screw 1.

In further embodiments, additionally a further zone, for instance a metering zone, is also arranged between the melting zone 2 and the mixing zone 4. In principle, a further zone can also be arranged between the mixing zone 4 and the wave zone 3. Respectively two zones 2, 3, 4 immediately adjoining one another along an imaginary screw longitudinal axis of the extruder screw 1 differ in particular with regard to the configuration (web pitch) or respectively with regard to the presence of a conveying web 5, 6.

Both the melting zone 2 and also the wave zone 3 have respectively at least one conveying web 5, 6. In the melting zone 2, the conveying web is designated as first conveying web 5. In the wave zone 3, the conveying web is designated as second conveying web 6. The respective first and second conveying web 5, 6 forms a main conveying web. Each of the first and second conveying webs 5, 6 extends in a helix-like manner/in a helix shape/spirally along the imaginary screw longitudinal axis. Therefore, the first conveying web 5 and the second conveying web 6 form respectively a screw thread on a radial outer side of the extruder screw 1.

In a further embodiment, the melting zone 2 is configured only single-threaded. In further embodiments, the melting zone 2 is at least double-threaded, namely triple-threaded. In this first example embodiment, however, it is configured double-threaded. Therefore, the melting zone 2, in addition to the first conveying web 5, has an intermediate conveying web 22. To illustrate a (first) conveying flight 23, formed in the melting zone 2, the first conveying web 5 is illustrated twice. The intermediate conveying web 22 extends parallel to the first conveying web 5, extending in a helix-shaped manner, along the imaginary screw longitudinal axis. The intermediate conveying web 22 is arranged in axial direction (along the imaginary screw longitudinal axis) of the extruder screw 1 between two screw-/thread pitches of the first conveying web 5. The (first) conveying flight 23 formed by the first conveying web 5 is divided by the intermediate conveying web 22 into two partial conveying flights 24a and 24b. The first conveying web 5 and the intermediate conveying web 22 have the same height, viewed in radial direction (with respect to the screw longitudinal axis).

The melting zone 2 is furthermore configured in FIG. 1 as a barrier zone (e.g. double-threaded, according to further embodiments single-threaded). In axial direction between the first conveying web 5 and the intermediate conveying web 22, a barrier web 19 is arranged. As barrier web 19 in particular a web is to be understood which is dimensioned so that it enables a backflow of melt component and/or of residual solid material components between the first and second partial conveying flights 24a and 24b. In contrast thereto, a conveying web, such as the conveying web 5, is to be understood as the web which is dimensioned so that it prevents/blocks a backflow of melt component and/or of residual solid material components between the thread pitches of the respective conveying flight, as here the first conveying flight 23. In addition, at each axial side of the intermediate conveying web 22 a barrier web 19; 19a, 19b) is arranged/formed. A first barrier web 19a is arranged/formed axially between a first thread pitch of the first conveying web 5 and the intermediate conveying web 22, and a second barrier web 19b is arranged/formed axially between the intermediate conveying web 22 and a second thread pitch of the first conveying web 5. The barrier webs 19a and 19b have a smaller radial height than the first conveying web 5 and the intermediate conveying web 22. In addition, it is preferred that a flight depth (depth of the first conveying flight 23/of the first and second partial conveying flights 24a and 24b) of the melting zone 2 decreases continuously/linearly along the screw longitudinal axis towards the mixing zone 4/downstream. It is also possible to leave the flight depth the same along the screw longitudinal axis in sections or completely in the melting zone 2/barrier zone. The conveying web 5, the intermediate conveying web 22 and/or the barrier webs 19a, 19b can likewise have a height decreasing continuously/linearly towards the mixing zone 4/downstream (alternatively a consistent radial height).

In this connection, reference is also made to FIG. 2, according to which in accordance with the second preferred example embodiment the barrier webs 19a, 19b are omitted. In FIG. 2, the melting zone 2 is configured as a conventional melting zone in the form of a compression zone. The flight depth (depth of the first conveying flight 23/of the first and second partial conveying flights 24a and 24b) of the melting zone 2 likewise decreases continuously/linearly along screw longitudinal axis towards the mixing zone 4/downstream. Here, also, it is possible to leave the flight depth identical along the screw longitudinal axis in sections or completely in the melting zone 2/compression zone.

Returning to the first example embodiment according to FIG. 1, it is pointed out that the wave zone 3 is configured as a conventional disperse plasticizing/melting zone. In a further embodiment, the wave zone 3 is configured only single-threaded, however in this first example embodiment it is configured double-threaded. The wave zone 3 is also equipped with a (second) intermediate conveying web 25, which in turn is arranged between two thread pitches, following one another axially, of the (second) conveying web 6 of the wave zone 3. The second intermediate conveying web 25 extends parallel to the second conveying web 6, extending in a helix-shaped manner, along the imaginary screw longitudinal axis. The second intermediate conveying web 25 divides a second conveying flight 26, formed by the second conveying web 6, in turn into a first partial conveying flight 29a and a second partial conveying flight 29b. The wave zone 3 is configured as a conventional wave zone and therefore has a flight depth altering in a wave-shaped manner along the (second) conveying flight 26 of the wave zone 3. The second conveying web 6 and the second intermediate conveying web 25 consequently change their radial height likewise in a wave-like manner along the second conveying flight 26, wherein the second conveying web 6 and the second intermediate conveying web 25 change their function alternately and in sections as conveying web and as barrier web.

Axially (with respect to the screw longitudinal axis) between the melting zone 2 and the wave zone 3, the mixing zone 4 is arranged. In the first and second example embodiment of FIGS. 1 and 2, the mixing zone 4 does not have a conveying web. Therefore, the first conveying web 5 terminates at an end 7 of the melting zone 2 facing the mixing zone 4. The intermediate conveying web 22 also terminates at the end 7 of the melting zone 2 facing the mixing zone 4. In addition, the second conveying web 6 begins in turn only at an end/start 8 of the wave zone 3 facing the mixing zone 4. The intermediate conveying web 25 also begins only at the end 8 of the wave zone 3 facing the mixing zone 4. Therefore, in this embodiment, the mixing zone 4 is embodied in a web-free manner. The mixing zone 4 therefore does not have any elongated elevations/webs, which extend in a helix-shaped manner around at least one thread pitch/ through at least 360°.

In FIG. 1 it can be seen furthermore that in the mixing zone 4 a plurality of mixing sections 9, 10 are present, indicated here only diagrammatically, wherein these mixing sections 9, 10 can in principle be configured differently, as described below with respect to FIGS. 6 and 8a to 8h.

Figure 6:
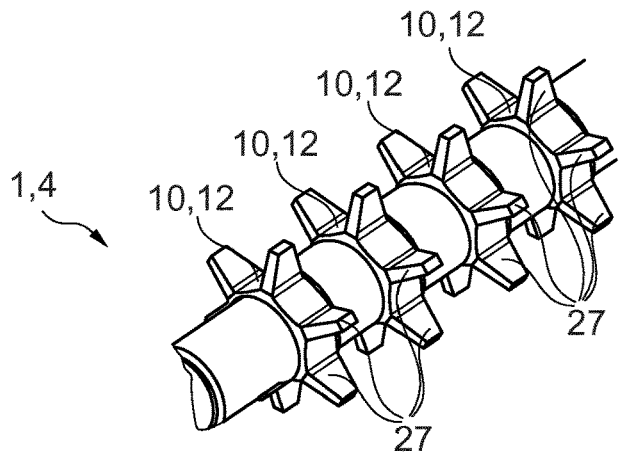
Figure 7:
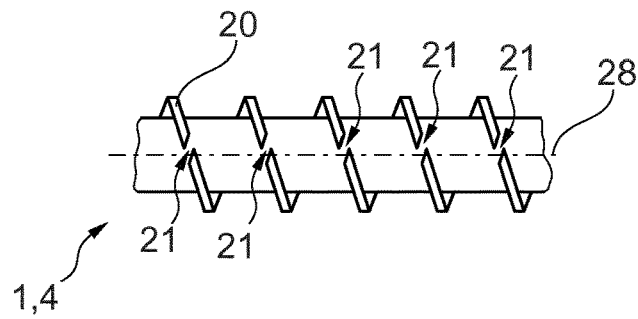

FIG. 6 shows a mixing zone 4 of the first example embodiment, in which a plurality of distributive mixing sections 10 are arranged. These distributive mixing sections 10 are configured as separate mixing elements and are mounted in a torque-proof manner on the extruder screw 1 in the region of the mixing zone 4. The (four) distributive mixing sections 10 are arranged spaced apart and next to one another in axial direction of the screw longitudinal axis. The distributive mixing sections 10 are respectively configured as a toothed disc 12/toothed ring. The respective toothed disc 12 is therefore provided with a ring-shaped base body on which several teeth 27 (spaced apart from one another in a circumferential direction) are arranged, forming an external toothing (straight toothing).

In connection with FIGS. 8a to 8h, it can be seen, however, that these mixing sections 9, 10 can in principle also be configured differently. The distributive mixing sections 10 can in principle also, as explained in further detail below, be replaced by disperse mixing sections 9 or can be provided additionally to these latter.

Compared to FIG. 6, it can be seen in FIG. 8a that the distributive mixing sections 10 can be constructed substantially also as a (third) screw section 11c of the extruder screw 1 forming directly/in one piece with regard to material with the mixing zone 4. Each mixing section 10 is configured as a helical toothing. The helical toothing is therefore formed by several strip-shaped integral elevations 15 arranged adjacent to one another in circumferential direction on the outer circumferential side of the extruder screw 1 in the mixing zone 4. The respective elevation 15 forms, in turn, a tooth 27.

Whilst the helical toothing formed in FIG. 8a is configured as involute toothing, it is also possible, according to FIG. 8b, not to configure the toothing as involute toothing. However, the distributive mixing sections 10 again have elevations 15 running parallel to one another. With regard to the elevations 15, it is pointed out that these extend around a restricted angle range around the outer circumferential side of the extruder screw 1 and respectively do not form a web extending through 360° to a complete thread pitch.

In connection with FIG. 8c, it is indicated that the distributive mixing sections 10 can also have several mixing pins 13 distributed in circumferential direction. In this example embodiment, the mixing pins 13 are again embodied in one piece with regard to material with the third screw section 11c. In principle, it is also sufficient to equip the mixing section 10 with only one mixing pin 13.

In connection with FIG. 8d, the distributive mixing section 10 is embodied as a group of rhombic elements 14/rhombic elevations 15 distributed in axial direction and in circumferential direction. The rhombic elements 14 are also formed in one piece with regard to material on the outer circumferential side of the extruder screw 1.

In connection with FIGS. 8e to 8h, it can be seen that the distributive mixing sections 10 are able to be replaced by disperse mixing sections 9. In FIG. 8e the disperse mixing section 9 is configured as a blister ring region/blister ring 18 in the mixing zone 4. This blister ring region 18 has a plurality of circular indentations/recesses distributed in circumferential direction and in axial direction of the extruder screw 1.

In FIGS. 8f and 8g further possible disperse mixing sections 9 in the form of shear gaps 16a, 16b are shown. In FIG. 8f a plurality of elevations 15 forming first shear gaps 16 are arranged running obliquely on the outer circumferential side of the extruder screw 1. In FIG. 8a a meander-shaped second shear gap 16b is shown.

In FIG. 8h the disperse mixing section 9 is embodied as a ring-shaped wedge gap region 17/wedge gap element.

The various mixing sections 9 and 10, as shown in FIGS. 8a to 8h, are known in principle from U.S. Pat. No. 6,136,246 A, for which reason the further statements mentioned herein with regard to these mixing sections are deemed to be integrated herein.

Instead of the use of the toothed disc 12, it is in principle also possible to configure the distributive mixing section 10 as a perforated disc/pierced disc. The perforated disc is preferably formed as a disc having a plurality of through-holes distributed in circumferential direction and running axially, and is fastened to the extruder screw 1, in the same manner as the toothed discs 12.

In principle it is also pointed out that in further example embodiments, the various mixing sections, i.e. the disperse and distributive mixing sections 9, 10 can be freely combined with one another, both as separate elements and also as a one-piece/integral element.

Figure 3:
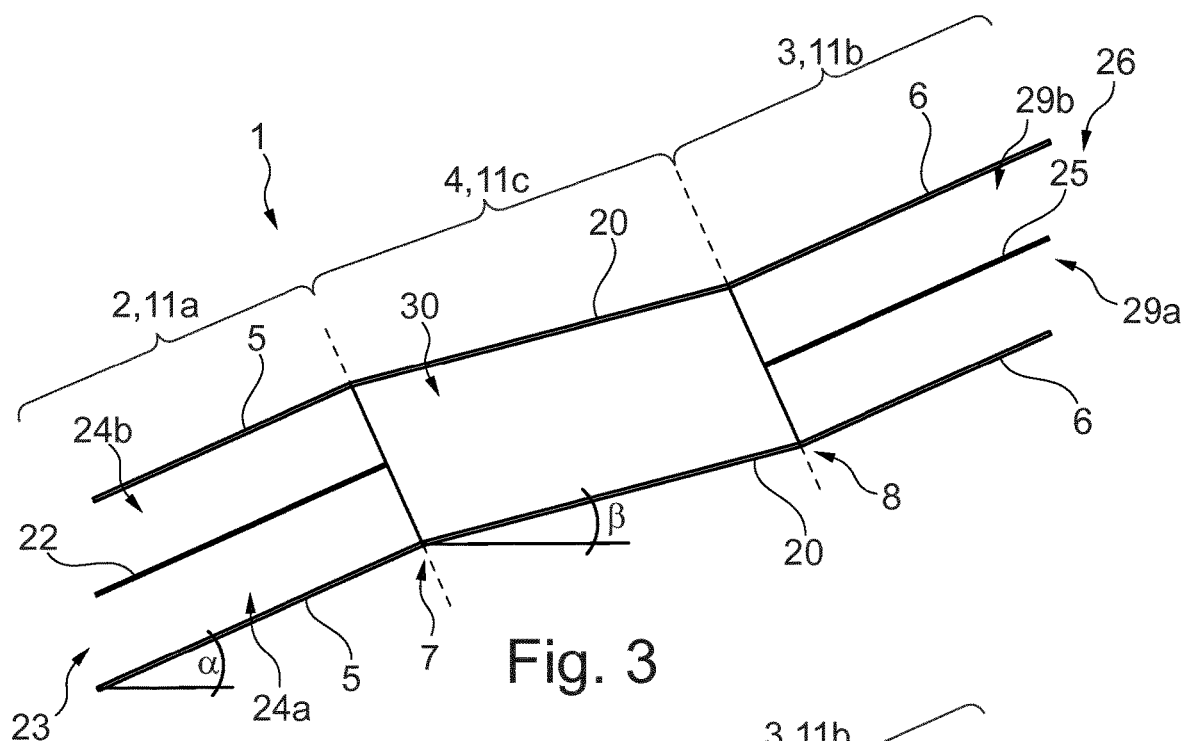
Figure 4:
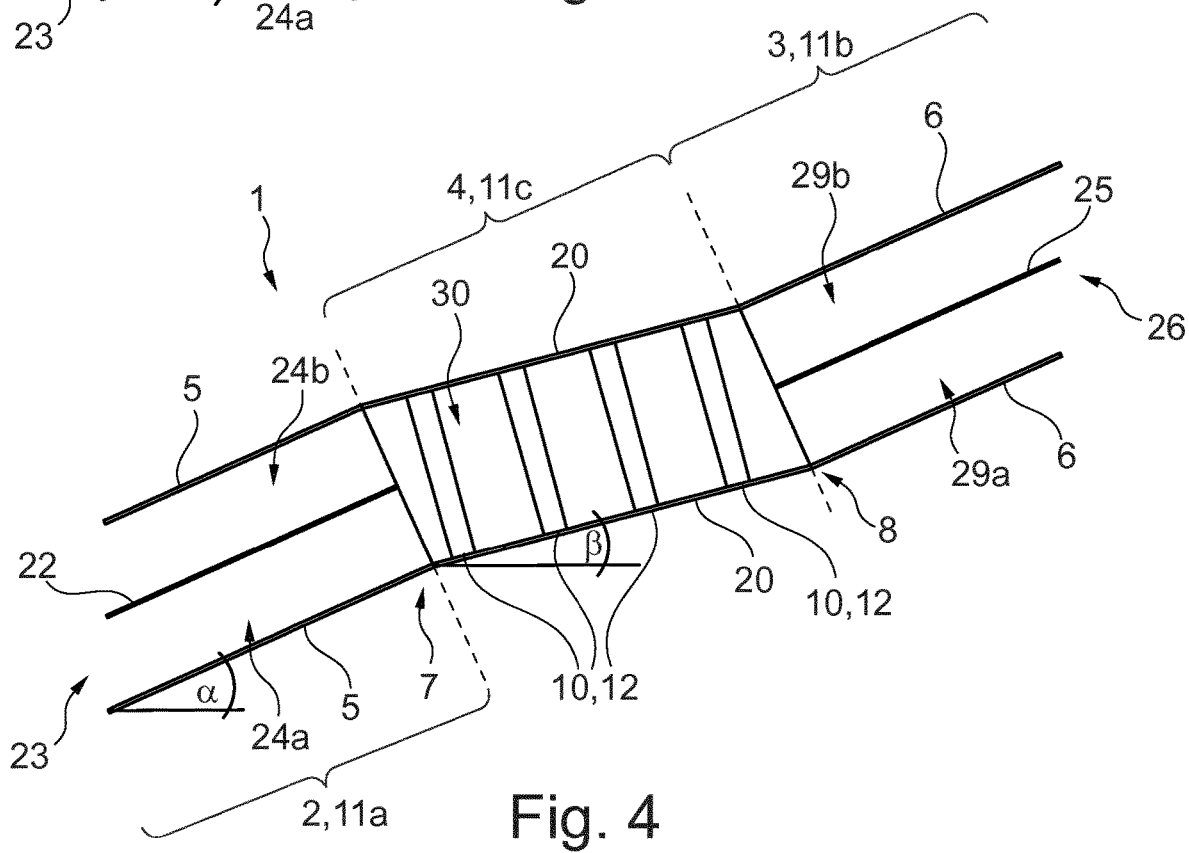
Figure 5:
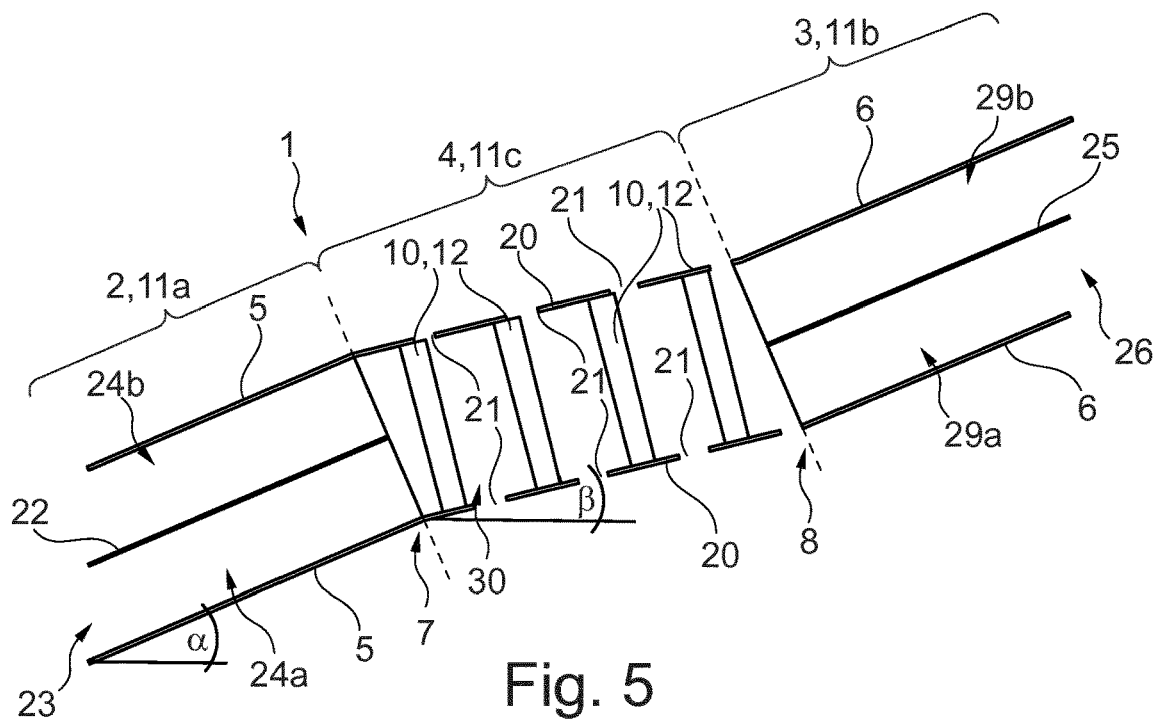

In connection with FIGS. 3 to 5, the further second idea according to the invention is shown by means of the third to fifth example embodiments. The extruder screws 1 of the third to fifth example embodiments of FIGS. 3 to 5, as already mentioned, in so far as not mentioned otherwise, are configured in accordance with the extruder screw of FIG. 1, for which reason only the differences with respect hereto are specified.

As can be seen in FIG. 3, the mixing zone 4 now likewise has a conveying web (third conveying web) 20. The third conveying web 20 also extends in a helix-like/helix-shaped/spiral-shaped manner along the imaginary screw longitudinal axis. The three conveying webs 5, 6, 20 immediately adjoin one another axially and continue into one another. The mixing zone 4 has with regard to its third conveying web 20, as shown through the angle β, a smaller flight pitch/web pitch than the melting zone 2, as shown through the angle α, with regard to its first conveying web 5. In addition, the mixing zone 4 can also have a smaller flight pitch/web pitch with regard to its third conveying web 20 than the wave zone 3 with regard to its second conveying web 6. The first conveying web 5 can, as also already illustrated by way of example in FIGS. 1 and 2, have the same web pitch as the second conveying web 6. However, embodiments also exist in which the web pitch of the wave zone 3 is identical to the web pitch of the mixing zone 4. The web pitches of the wave zone 3 and of the melting zone 2 in further embodiments, can be selected to be not identical to one another as shown here, but rather to be different from one another.

In FIG. 3, the melting zone 2, as already implemented in the second example embodiment, is configured double-threaded (in further embodiments triple-threaded or alternatively single-threaded) and as a conventional compression zone without barrier web. Therefore, in this example embodiment, the melting zone 2 is not configured as a barrier zone, but rather as a conventional melting zone. In addition, the mixing zone 4 is embodied single-threaded. The third conveying web 20 therefore forms a single (third) conveying flight 30. The mixing zone 4 is, in addition, configured in accordance with the third example embodiment without mixing sections/free of mixing sections.

The fourth example embodiment according to FIG. 4 then differs in turn from the third example embodiment in that a plurality of distributive mixing sections 10 are present in the mixing zone 4. The practical configuration of these mixing sections 10 and the mixing sections 9, 10 which are able to be used alternatively for these mixing sections 10 can be seen, in turn, from the previously stated explanations with regard to FIG. 1 and FIGS. 6 and 8a to 8h.

The fifth example embodiment according to FIG. 5 then differs in turn from the fourth example embodiment in that the third conveying web 20 has a plurality of axial openings 21, which are introduced spaced apart along the third conveying web 20. The openings 21 are also shown again in FIG. 7. The openings 21 penetrate the third conveying web 20 therefore partially in axial direction of the extruder screw and serve as backflow passages between the thread pitches formed by the third conveying web 20. The openings 21 are configured as slots or channels.

In other words, in operation of the extrusion device according to the invention, the solid material bed is comminuted to as small a particle size as possible before the entry into the wave zone (wave zone 3), in order to increase the melting performance. Between the conventionally melting part of the screw 1 in the form of the melting zone 2, irrespective of whether it is configured as a barrier- or compression zone, which can have a single- or multi-threaded configuration, and the wave zone 3, a mixing zone 4 is placed, which achieves as intensive a breaking and distribution of the solid material bed as possible and as good a mixing between solid material and melt as possible. Distributive and/or disperse mixing elements (mixing sections) 9, 10 are deliberately used. Distributive mixing elements 10 can be, inter alia, toothed discs 12, perforated discs, mixing pins 13 and/or rhombic elements 14. In this case, shear gaps 16a, 16b, blister rings 18 and/or wedge gap elements 17 are suitable as disperse mixing elements 9. Through the use of distributive and disperse mixing elements 9, 10 a distinctly more intensive mixing is achieved in the mixing zone 4 and a more intensive distribution and breaking of the solid material bed. Thereby, the particle size of the residual solid material which is transferred into the wave zone 3 is distinctly reduced in size, for which reason the wave zone 3 plasticizes more efficiently and thus, also, a higher plasticizing performance is achieved. In addition to the mixing elements 9, 10, preferably any webs in the mixing zone 4 can be removed, in order to enable a free flow of the melt or respectively a free mixing of melt and of the solid material. Through the free flow, the efficacy of the mixing elements 9, 10 is further increased, because cross flows arise, which bring about an additional mixing and redistribution. When a main web (third conveying web 20) is present in the mixing zone 4, the flight pitch is smaller than or equal to in the previous, conventional melting zone 2. With the reduction of the pitch, the dwell times in the mixing zone 4 are increased, and thus a better mixing effect is achieved. The mixing zone 4 is embodied as a maximum single-threaded, partly also without web 20. In addition, the main web 20, if present, can have openings 21, in order to achieve a better mixing effect.

LIST OF REFERENCE NUMBERS 1 extruder screw
2 melting zone
3 wave zone
4 mixing zone
5 first conveying web
6 second conveying web
7 end of the melting zone
8 end of the wave zone
9 disperse mixing section
10 distributive mixing section
11a first screw section
11b second screw section
11c third screw section
12 toothed disc
13 mixing pin
14 rhombic element
15 elevation
16a first shear gap
16b second shear gap
17 wedge gap region
18 blister ring region
19 barrier web
19a first barrier web
19b second barrier web
20 third conveying web
21 opening
22 intermediate conveying web/first intermediate conveying web
23 first conveying flight
24a first partial conveying flight
24b second partial conveying flight
25 second intermediate conveying web
26 second conveying flight
27 tooth
28 screw longitudinal axis
29a first partial conveying flight
29b second partial conveying flight
30 third conveying flight

What is claimed is:

1. An extruder screw (1) for use with an extrusion device having an inlet and an outlet, the extruder screw for the plasticizing of at least one plastic material or a plastic material mixture, the extruder screw (1) comprising a melting zone (2), a wave zone (3) and a mixing zone (4) arranged between the melting zone (2) and the wave zone (3), the mixing zone (2) in direct connection to the melting zone (2), wherein the melting zone (2) extends from said inlet of said extrusion device and terminates at the mixing zone (4), wherein a flight depth of the melting zone (2) decreases continuously in the extrusion direction along a longitudinal axis of the screw towards the mixing zone (4) and a conveying web (5, 6) extending in a helix-like manner along the longitudinal axis of the screw is formed in the melting zone (2) and in the wave zone (3), wherein a conveying web (5) of the melting zone (2) terminates at an end (7) of the melting zone (2) facing the mixing zone (4), and the conveying web (6) of the wave zone (3) begins at an end (8) facing the mixing zone (4).

2. The extruder screw (1) according to claim 1, wherein the wave zone (3) is arranged in direct connection to the mixing zone (4).

3. The extruder screw (1) according to claim 1, wherein the melting zone (2) is multi-threaded.

4. The extruder screw (1) according to claim 1, wherein the wave zone (3) is multi-threaded.

5. The extruder screw (1) according to claim 1, wherein the melting zone (2) is configured at least partially as a compression zone.

6. The extruder screw (1) according to claim 1, wherein the mixing zone (4) has at least one mixing section (9, 10) promoting a distributive and/or disperse mixing of a solid material component with a plasticized component of the at least one plastic material or plastic material mixture.

7. The extruder screw (1) according to claim 6, wherein the at least one mixing section (9, 10) is in one piece with regard to material with a screw section (11c) forming the mixing zone (4), or is formed separately to the screw section (11c) forming the mixing zone (4).

8. The extruder screw (1) according to claim 6, wherein the at least one mixing section (10) is configured as a toothed disc (12), a perforated disc, a mixing pin (13), or a rhombic element (14), or has a strip-shaped elevation (15).

9. The extruder screw (1) according to claim 6, wherein the at least one mixing section (9) is configured as a shear gap (16a, 16b), a blister ring (18) or a wedge gap region (17).

10. The extruder screw (1) according to claim 1, wherein the melting zone (2) is configured at least partially as a barrier zone, wherein in addition to the conveying web (5) a barrier web (19) is present, which has a smaller radial height than the conveying web (5).

11. An extruder screw (1) for use with an extrusion device having an inlet and an outlet, the extruder screw for the plasticizing of a least one plastic material or a plastic material mixture, the extruder screw (1) comprising a melting zone (2), a wave zone (3) and a mixing zone (4) arranged between the melting zone (2) and the wave zone (3), wherein the three zones (2, 3, 4) have respectively a conveying web (5, 6, 20) extending in a helix-like manner along a screw longitudinal axis, and a web pitch of a conveying web (20)

running in the mixing zone (4) is smaller than or equal in size to a web pitch of a conveying web (5) running in the melting zone (2), the melting zone beginning at said inlet of said extrusion device and terminating at the mixing zone (4), wherein the melting zone (2) is equipped with at least one conveying web (5, 22) extending in a helix-like manner along the screw longitudinal axis, which conveying web has a radial height decreasing continuously in the extrusion direction towards the mixing zone (4).

12. The extruder screw (1) according to claim 11, wherein the melting zone (2) is equipped with two or more conveying webs (5, 22) extending in a helix-like manner along the screw longitudinal axis, which conveying webs (5, 22) have the same radial height.

13. The extruder screw (1) according to claim 11, wherein the conveying web (20) of the mixing zone (4) has an opening (21).

14. The extruder screw (1) according to claim 11, wherein the mixing zone (4) is configured single-threaded.

15. A method for plasticizing at least one plastic material or a plastic material mixture by means of said extrusion device according to claim 1.

* * * * *